United States Patent
Hartrick et al.

(10) Patent No.: US 9,559,964 B2
(45) Date of Patent: Jan. 31, 2017

(54) CONTROL MESSAGE ROUTING WITHIN ANYCAST RELIANT PLATFORMS

(71) Applicant: EdgeCast Networks, Inc., Playa Vista, CA (US)

(72) Inventors: Timothy W. Hartrick, Boulder, CO (US); Marc Hasson, Los Angeles, CA (US); Juan Bran, Los Angeles, CA (US); Hossein Lotfi, Mountain View, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 0 days.

(21) Appl. No.: 14/819,787

(22) Filed: Aug. 6, 2015

(65) Prior Publication Data
US 2015/0341431 A1    Nov. 26, 2015

Related U.S. Application Data

(63) Continuation-in-part of application No. 14/170,002, filed on Jan. 31, 2014, now Pat. No. 9,276,841.

(51) Int. Cl.
*G06F 15/173* (2006.01)
*H04L 12/803* (2013.01)
*H04L 12/761* (2013.01)

(52) U.S. Cl.
CPC ............. *H04L 47/125* (2013.01); *H04L 45/16* (2013.01)

(58) Field of Classification Search
None
See application file for complete search history.

(56) References Cited

U.S. PATENT DOCUMENTS

| | | | | |
|---|---|---|---|---|
| 7,574,499 | B1 * | 8/2009 | Swildens | G06F 9/505 709/202 |
| 8,601,565 | B1 * | 12/2013 | Sakata | G06F 21/00 726/11 |
| 2012/0215915 | A1 * | 8/2012 | Sakata | H04L 12/6418 709/224 |

* cited by examiner

*Primary Examiner* — Brian P Whipple
(74) *Attorney, Agent, or Firm* — Los Angeles Patent Group; Arman Katiraei (57) ABSTRACT

Some embodiments provide a transport session discovery protocol that enables load balancing devices of an Anycast reliant distributed platform to route legacy control messages to destinations within the distributed platform that manage the sessions or connections implicated by the legacy control messages, even when the implicated sessions or connections cannot be directly identified from the control message headers. The modified load balancing operation as a result of the transport session discovery protocol involves identifying a message header mapping to an unrecognized session or connection, extracting session or connection identifying information and an error or condition from the message body, generating a new messaging construct to encapsulate the extracted information, and multicasting the messaging construct to other load balancing devices operating within a common point-of-presence. The load balancing device having knowledge of the server managing the implicated session then routes the error or condition to that server.

19 Claims, 8 Drawing Sheets

CONTROL MESSAGE ROUTING WITHIN ANYCAST RELIANT PLATFORMS

CLAIM OF BENEFIT TO RELATED APPLICATIONS

This application is a continuation-in-part of U.S. nonprovisional application Ser. No. 14/170,002 entitled "Adapting Network Control Messaging for Anycast Reliant Platforms", filed Jan. 31, 2014. The contents of application Ser. No. 14/170,002 are hereby incorporated by reference.

TECHNICAL FIELD

The present invention relates to Anycast routing and, more specifically, to adapting network control messaging for platforms reliant on Anycast routing.

BACKGROUND ART

Anycast is a network addressing and routing methodology for routing packets from a sender to the closest of several potential recipients that are each identified with the same address. Anycast is built upon the Border Gateway Protocol (BGP). BGP advertisements announce that the same address is available at different topological locations throughout a network (i.e., Internet). Routers receiving the advertisements continually cull their routing tables to identify the shortest path to one such Anycast destination.

Anycast lends itself for use with a distributed platform. A distributed platform operates a plurality of geographically distributed points-of-presence (PoPs) for the purpose of serving content or providing services from each of those PoPs to different sets of users in a distributed manner. Each PoP typically includes at least two collocated servers. The multiple servers of a given PoP host the same or different content and/or perform the same or different services. This ensures that the PoP has adequate resources for serving the content or for providing the various services while also ensuring redundancy and balanced load distribution across the PoP.

By using Anycast in combination with such a distributed platform, user requests for content or services can be routed to the distributed platform PoP that is closest to the requesting user. In so doing, the Anycast identified PoP can deliver the content or services in an optimal manner, in part, because of the proximity to the user. The proximity to the user reduces the number of hops or network nodes over which the content or service travels in order to reach the user. Each additional hop or node increases the potential for added latency, buffering, and packet loss. A content delivery network (CDN) is an example of a distributed platform that benefits from the routing efficiencies of Anycast.

Figure 1:
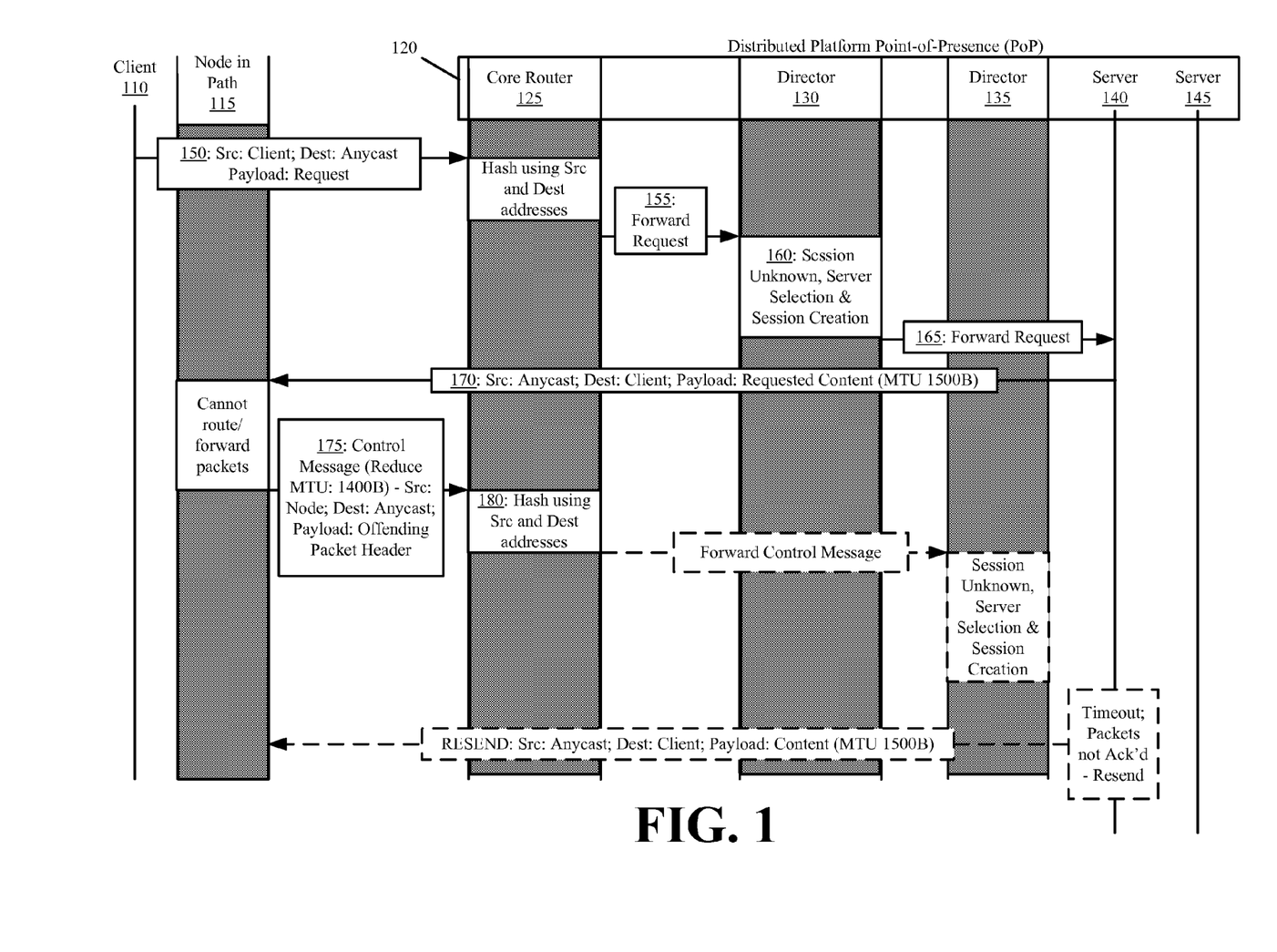
FIG. 1 provides an exemplary case of legacy control messaging producing aberrant behavior in an Anycast reliant distributed platform.

However, some legacy routing and control mechanisms of underlying networking protocols were never designed to work with such Anycast reliant distributed platforms. As a result, aberrant behavior may occur in these Anycast reliant distributed platforms. FIG. 1 provides an exemplary case of legacy control messaging producing aberrant behavior in an Anycast reliant distributed platform.

FIG. 1 presents a message exchange between a client 110 and an Anycast identified PoP 120 of a distributed platform, wherein the aberrant behavior results from a control message that is issued by an intermediary node 115 in the path connecting the client 110 to the PoP 120. In this figure, the PoP 120 includes a core router 125, two directors 130 and 135, and two servers 140 and 145, wherein the directors 130 and 135 are load balancing devices distributing loads across the servers 140 and 145. It should be noted that the same aberrant behavior illustrated by FIG. 1 may occur if the PoP 120 was horizontally or vertically scaled to include more core routers, directors, or servers.

The message exchange of FIG. 1 commences with the client 110 submitting (at 150) a request for content to an Anycast address of the distributed platform. Anycast routing delivers the request to the PoP 120 and more specifically, to the core router 125. The core router 125 performs a simple hash of the source and destination addresses specified in the request header to select director 130 to process this request and any subsequent messages identifying the same source and destination addresses. The core router 125 then forwards (at 155) the request to the selected director 130.

The director 130 is tasked with selecting (at 160) a server from the set of servers 140 and 145 to respond to the user request. The director 130 first performs a session table lookup to determine if a prior session is established for the request and if a server has already been selected to handle the session. In this case, no prior session exists. The director 130 selects server 140 based on a hash of the name and/or path of the content specified in the request and/or addressing information from the request header. The director 130 creates a session table entry such that future inbound packets from the client 110 that are associated with the session are properly routed to the correct server 140. The session can be identified by any of the requested content name, requested content path, or a source and destination address combination, wherein the term address refers to any one or more of a Media Access Control (MAC) address, Internet Protocol (IP) address, and application or transport layer protocol port number. In this example, the session table entry identifies the current session with a source IP address, a source port, a destination IP address, and a destination port. After creating the session, the director forwards (at 165) the request to the selected server 140.

The server 140 processes the request and begins serving (at 170) the requested content to the client 110 in response. However, the intermediary node 115 in the network path between the client 110 and the server 140 submits (at 175) a control message back to server 140 or the Anycast address specified by the original request. Control messages can be used for a variety of reasons. For the current example, the control message indicates that the intermediary node 115 cannot support the manner in which the server 140 sends the content. One such control message indicates that the intermediary node 115 does not support packets of the size submitted by the server 140 and that the server 140 should retransmit the packets with a smaller size. Such a control message can be an Internet Control Message Protocol (ICMP) message indicating that the packet(s) exceeds the maximum transmit unit (MTU) supported by the intermediary node 115. It is important to note that the control message source address is the intermediary node's 115 address and not the address of the client 110. Also, in some instances, the control message destination address may identify the Anycast address and not the unique IP address for the actual server 140 within the PoP 120 that transmits the offending packets that cause the intermediary node 115 to issue the control messages.

Anycast routing delivers the intermediary node 115 control message back to the core router 125 (provided that Anycast routing continues to identify the PoP 120 of the core router 125 as the closest distributed platform PoP reachable using the Anycast address). The core router 125 may select (at 180) an incorrect director that has no knowledge of the client's 110 active session (i.e., director 135) as the selection is based on a hash of the intermediary node 115 address that is provided in the control message header rather than the client 110 address. If the control message is passed from the core router 125 to director 135 (i.e., the incorrect director), the director 135 is unable to identify the server 140 or the session to which the control message relates. The session table maintained by director 135 will not have an entry for the address combination in the control message header or addressing from an offending packet header which may be included as part of the control message. In this case, director 135 will ignore the control message such that the control message does not arrive at the appropriate server 140 sending the offending packets. Until the server 140 receives the control message, the server 140 will continue to send the offending packets and the intermediary node 115 will continue to block or drop those packets, thus preventing the client 110 from receiving the requested content.

The above depicts one scenario where aberrant behavior results from legacy control mechanisms in an Anycast reliant distributed platform. In summary, the aberrant behavior results when the session implicated by a control message cannot be identified from the control message.

In most cases, the operational behavior of the core router 125 leading to the improper routing of the control messages amongst a set of directors cannot be modified. This can be due to a variety of reasons including the core router's use of proprietary algorithms to perform the message distribution across the directors. In addition to being proprietary and unchangeable by any one other than the core router manufacturer, the algorithms may be directly incorporated into inaccessible or non-configurable application specific integrated circuits (ASICs) or other integrated circuits of the device that cannot be modified by the distributed platform.

Similar aberrant behavior can be observed in different distributed platform architectures that rely on Anycast routing. The aberrant behavior can also be observed when different control messages, error messages, or status messages besides the exemplary case described above are issued from intermediary network nodes to a distributed platform that uses Anycast routing. Accordingly, there is a need to resolve the aberrant behavior that occurs from the inability to directly identify from a control, error, or status message, the connection or session to which the message relates. Stated inversely, there is a need to adapt legacy control mechanisms and various control, error, or status messages, such as ICMP and MTU too large messages, for Anycast reliant distributed platforms.

BRIEF DESCRIPTION OF THE DRAWINGS

A preferred embodiment of methods and systems for control message routing within Anycast reliant distributed platforms will now be described, by way of example only, with reference to the accompanying drawings in which.

DETAILED DESCRIPTION

Some embodiments provide a transport session discovery protocol (TSDP) for adapting legacy control messages for use by distributed platforms that rely on Anycast routing. The TSDP routes legacy control messages to destinations within the distributed platform that manage the sessions or connections implicated by the legacy control messages, even when the implicated sessions or connections cannot be directly identified from the control message headers. The TSDP identifies a message header mapping to an unrecognized session or connection, extracts additional session or connection identifying information from the message body, and leverages a collective pool of session or connection information from a collocated or collaborating set of load balancing devices in order to route the message to the correct destination managing the session or connection implicated by the message.

Figure 2:
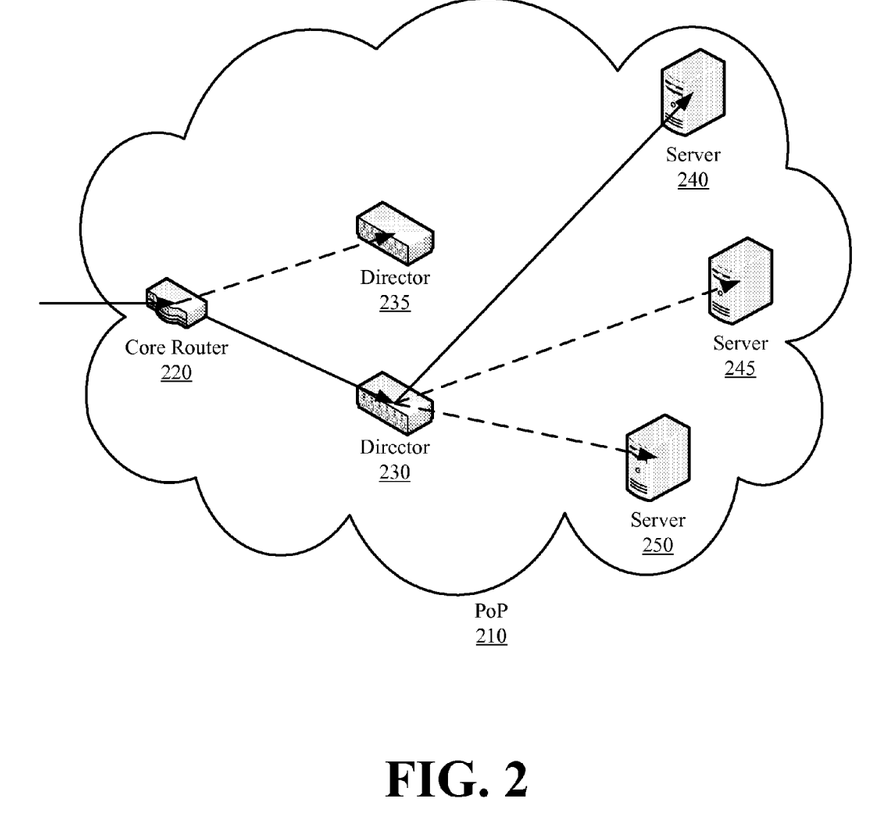
FIG. 2 illustrates an exemplary distributed platform PoP in which the transport session discovery protocol of some embodiments can be implemented.

An Anycast reliant distributed platform can be any cloud, content, or service provider that uses a common address to identify two or more nodes or Points-of-Presence (PoPs) within the provider platform or architecture. FIG. 2 illustrates an exemplary distributed platform PoP 210 in which the TSDP of some embodiments can be implemented.

The PoP 210 includes three tiers of nodes. The first tier node is a core router 220. The second tier nodes are a pair of directors 230 and 235. The third tier nodes are three servers 240, 245, and 250. The core router 220, directors 230 and 235, and servers 240, 245, and 250 may be physically separate machines or a set of virtual machines that execute over partitioned sets of resources of one or more physically separate machines. The hardware of these physical or virtual machines is described in FIG. 8. A Content Delivery Network (CDN) is representative of an Anycast reliant distributed platform with one or more of the FIG. 2 PoPs. It should be noted that the TSDP of some embodiments is applicable even if the exemplary PoP 210 or its respective tiers are scaled vertically or horizontally.

The core router 220 is typically configured with an Anycast address that is also configured to other core routers operating within other distributed platform PoPs. The core router 220 advertises the Anycast address to neighboring network routers. The network routers track whichever distributed platform core router advertising the Anycast address is closest to them. The network routers then route packets addressed to the Anycast address to the nearest distributed platform core router advertising the Anycast address. Accordingly, all incoming packets that are addressed to the Anycast address and that are routed to the PoP 210 because of Anycast routing are first received by the core router 220. In some embodiments, the core router 220 is also configured with a virtual Internet Protocol (IP) address to uniquely identify the core router 220 from other nodes of the PoP 210.

The core router 220 distributes the incoming packets across the directors 230 and 235. The distribution of packets across the directors 230 and 235 is controlled by a hash in some embodiments, though other distribution schemes may be used in other embodiments. As one example, the core router 220 distributes the incoming packets across the directors 230 and 235 based on a hash of the source and destination address of each incoming packet. As used hereafter, the term address references an IP address, Media Access Control (MAC) address, a port number (e.g., a Transmission Control Protocol (TCP) port or User Datagram Protocol (UDP) port), or some combination thereof. Accordingly where reference is made to a source address, that reference may imply a combination of a source IP address and source TCP port number.

The directors 230 and 235 are load balancing devices that operate to select one of the third tier nodes, servers 240, 245, and 250, to process the incoming packets. After selecting one of the servers 240, 245, and 250 to respond to a packet, the director operates to ensure that all subsequent messages directed to the same session or connection are routed to the same server, wherein the session or connection refers to an exchange of multiple packets as part of an ongoing communication for requesting and providing content or services from a server to a client.

Each director 230 and 235 maintains its own session table to track the sessions between various clients and the servers 240, 245, and 250. Each session is tracked with a specific session table entry. A client request for content or a service initiates creation of a session. Once the request has been fulfilled by passing the requested content or service to the client, the session can be closed and the corresponding entry in the session table can be removed. A session identifier identifies each session. In some embodiments, the session identifier is an IP address and port combination. In some embodiments, each session identifier for a corresponding session table entry specifies a source IP address and source port combination, a destination IP address and destination port combination, or both. It should be apparent that other session identifiers can be used in identifying sessions and the TSDP described below can be adapted for these different session identifiers. In some embodiments, the PoP may omit the core router 220 such that one or more of the directors 230 and 235 directly receive packets from an external network.

The third tier nodes including servers 240, 245, and 250 are tasked with responding to client requests and providing the content or the service requested by a client throughout the duration of a session with that client. The servers 240, 245, and 250 include caching servers, application servers, or some combination thereof as some examples. Caching servers host content of various content providers for the purpose of serving that content to clients on behalf of the content providers. Such content can be static, dynamic, or streaming. Application servers perform various services on behalf of the clients.

As noted above, the TSDP is provided to correctly route a control, error, or status message received by a director to one of the PoP servers managing an established session or connection implicated by the message when the director cannot identify the implicated session or connection from the message header. As noted in the "Background Art" section, this situation can occur when an intermediary node connecting a client and a PoP server sends any kind of control, error, or status message in response to an offending packet passed as part of an ongoing session between the client and the PoP server. If the core router routes the control message to a director having no knowledge of the session implicated by the control message, the control message will be ignored and will not reach the server sending the offending packets. Specifically, if the director was to hash the control message addressing or addressing from the offending packet header included as part of the control message, the hash result would not match any session identifier within the director's session table.

The TSDP resolves these issues through the concerted operation of the PoP directors. As such, each director operating within the same PoP is configured to implement the TSDP. It is worth noting that the described embodiments and TSDP implementation involve modifying operational behavior of the directors without modifying the server or core router operation.

In some embodiments, the TSDP configuration involves configuring the directors to join a particular protocol multicast group. Any messages sent to the particular protocol multicast group will be received by all directors that have joined that particular protocol multicast group. In some other embodiments, the directors implementing the TSDP are configured to broadcast TSDP messages to other directors instead of multicasting the TSDP messages. In some other embodiments, the directors implementing the TSDP are configured to unicast TSDP messages directly to other directors within a PoP using unique VIPs assigned to each of the PoP directors.

In some embodiments, the TSDP configuration also involves enumerating the specific messages that are subject to the TSDP. From this definition, application of the TSDP can be restricted to specific sets of control, error, or status messages. Application of the TSDP can also be restricted to specific message protocols, message types, or port numbers. For instance, the directors can be configured such that the TSDP is applied only to Internet Control Message Protocol (ICMP) messages, or more granularly, to specific subsets of ICMP messages including type 3 ICMP messages with a code value of 4 indicative of a message that exceeds a maximum transmission unit (MTU) of a downstream node or a code value of 11 indicative of the network being unreachable for a specified Type of Service (ToS).

The TSDP configuration further involves modifying director operation in the event the director encounters one of the specific messages that are subject to the TSDP or in the event the director encounters TSDP messages from other directors. Accordingly, each director is configured to generate and respond to TSDP messages.

Figure 3:
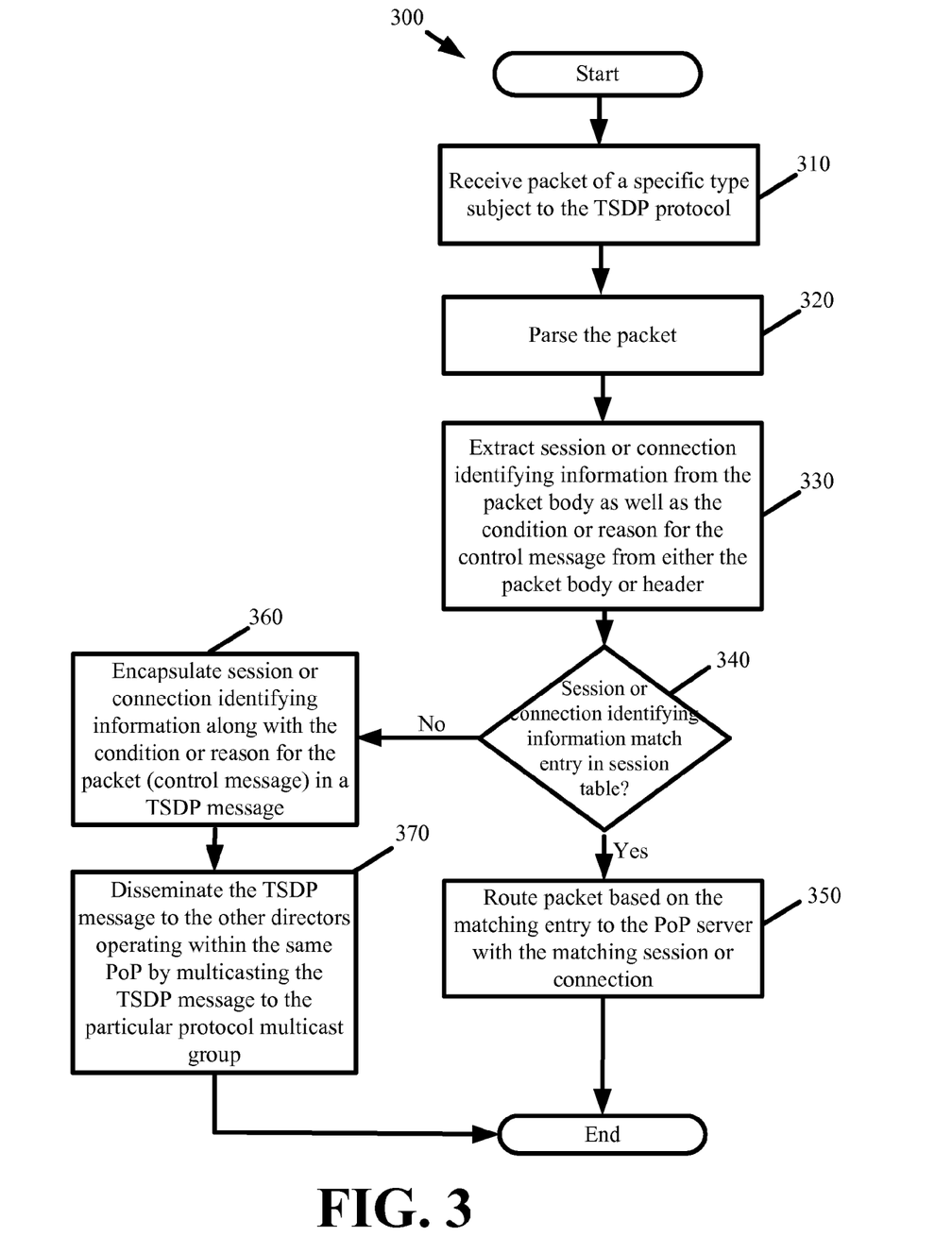
FIG. 3 presents a process describing modified director operations according to the TSDP of some embodiments.

FIG. 3 presents a process 300 describing modified director operations according to the TSDP of some embodiments. The process 300 commences when a director receives (at 310) a packet that is subject to the TSDP. As noted above, depending on the TSDP configuration packets including control messages (including ICMP messages), error messages, status messages, and/or certain message protocols can be subject to the TSDP. In this figure, it is assumed that the received packet is a control message. Packets that are not subject to the TSDP are processed according to regular director operation. As part of its regular operation, the director hashes addressing from the packet header, determines if a session exists for the packet or if one should be created, and forwards the packet to one of the PoP servers that manages the preexisting session or that is tasked to create the new session between the selected server and the requesting client.

Upon receiving a packet that is subject to the TSDP, the process parses (at 320) the packet. The process extracts (at 330) session and connection identifying information from the packet body and further extracts a condition or reason for the control message from either the packet body or header. For an ICMP message, the packet body contains a data section that includes the entire IP header and some initial number of bytes of data from the offending packet that resulted in the ICMP message being issued. This is the information from which the directors can identify the session that is implicated by the control message. The offending packet IP header specifies the address for the session client, instead of the intermediary node address, as the destination address and may specify the address of the specific PoP server sending the offending packet, instead of the distributed platform Anycast address, as the source address. The connection identifying information includes TCP connection information including at least the TCP sequence number. Other control, error, or status messages similarly embed the offending packet information within the message body.

The process determines (at 340) if the extracted session and connection identifying information matches to an entry within the director's own session table. In some embodiments, step 340 may involve hashing the extracted session and connection identifying information. If a match is found to an existing session and connection within the director's session table, the packet is routed (at 350) to the PoP server identified within the session table to be managing that session. If no match is found in the director's own session table, the process encapsulates (at 360) the extracted session and connection identifying information along with the condition or reason for the control message in a specialized TSDP message. In some embodiments, the specialized TSDP message is a User Data Protocol (UDP) datagram. The TSDP message summarizes and includes only the relevant addressing and information from the received control message. All extraneous information that is unrelated to identifying the session, the connection (e.g., TCP sequence number), the condition, or the error at issue is omitted. The process disseminates (at 370) the generated TSDP message to the other directors operating within the same PoP by multicasting the TSDP message to the particular protocol multicast group. In some embodiments, the ability of the directors to multicast TSDP messages is rate limited. The rate limiting prevents control message based attacks from generating high volumes of intra-PoP traffic that could hinder performance of the directors and other PoP nodes.

Figure 4:
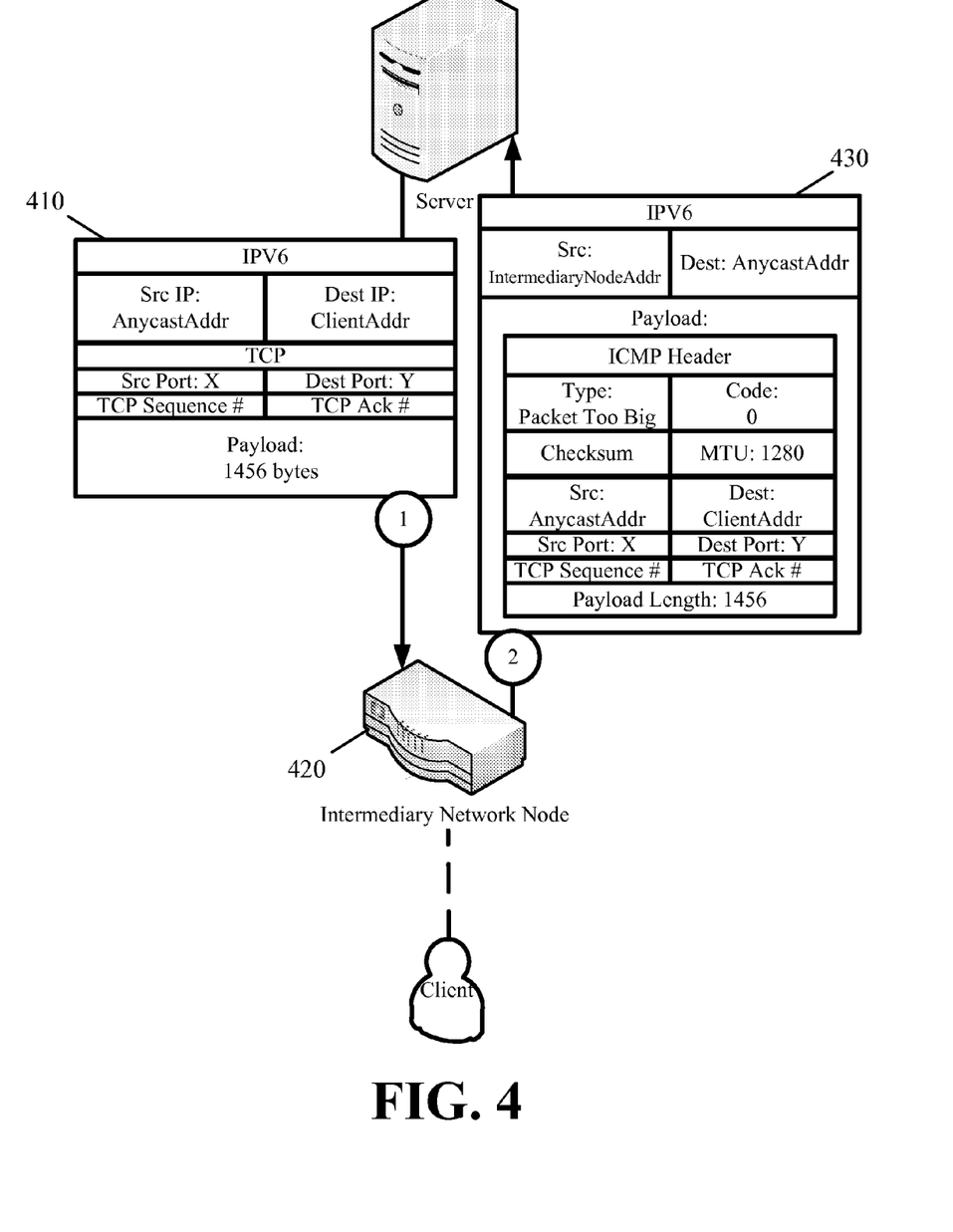
FIG. 4 illustrates an example of an offending packet being received at an intermediary node and a control message being sent from the intermediary node identifying the issue in accordance with some embodiments.

FIG. 4 illustrates an example of an offending packet 410 that is sent from a distributed platform PoP server to an intermediary node 420 and a control message 430 that is sent from the intermediary node 420, wherein the control message 430 identifies an issue with the server submitted packet 410. Of particular importance is the addressing provided in the offending packet 410 header and the addressing provided in the control message 430 header.

The offending packet 410 header specifies the IP address and port of the distributed platform server responding to the client request as the source and the client's IP address and port as the destination. In this example, the source address is the Anycast address first used by the client when issuing the request to the distributed platform.

The control message 430 header specifies the IP address of the intermediary node 420 as the source and the source IP address from the offending packet 410 header as the destination. The control message 430 also includes the header of the offending packet 410 as part of its payload.

Figure 5:
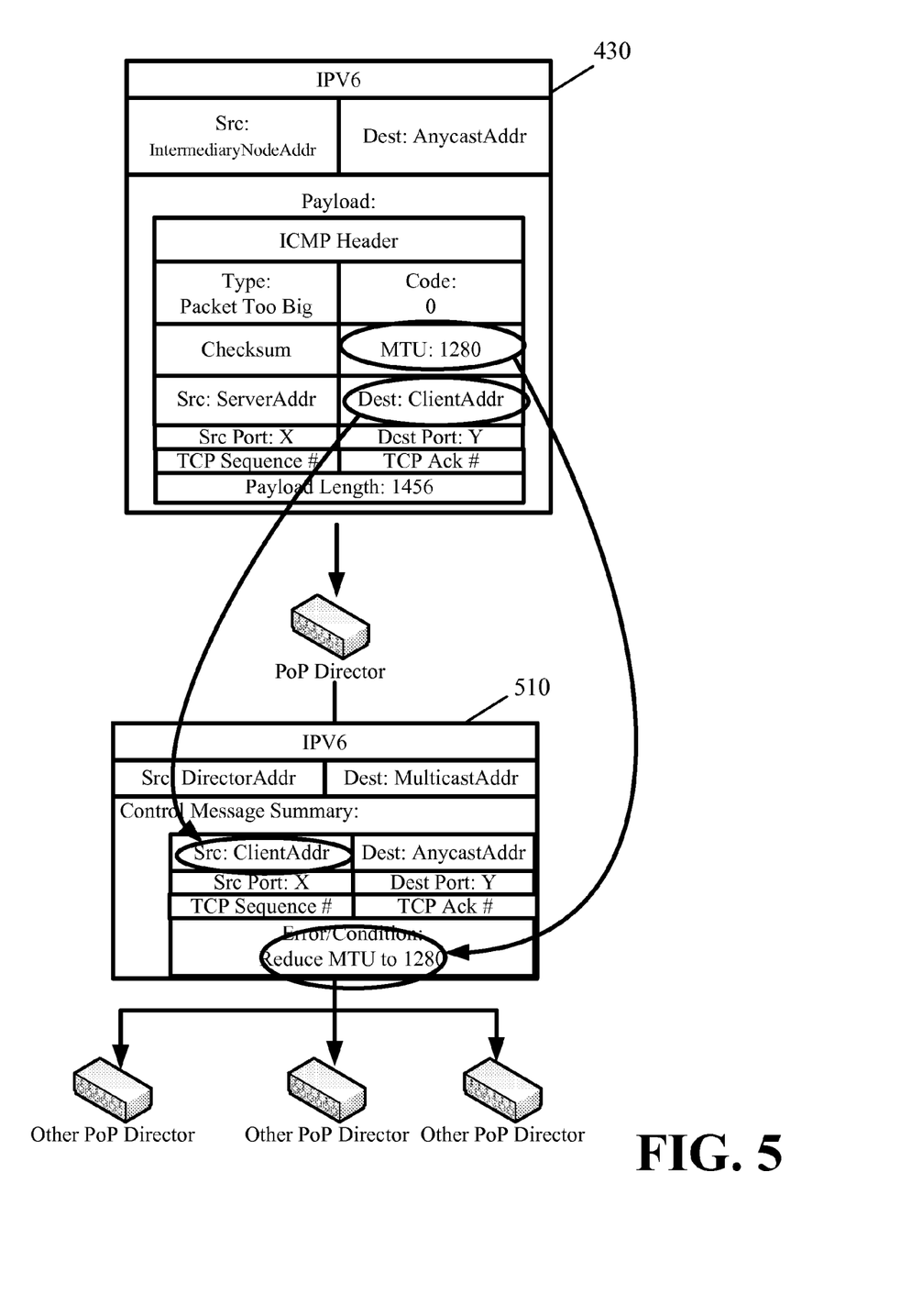
FIG. 5 conceptually illustrates a transport session discovery protocol message that a director implementing the transport session discovery protocol in accordance with some embodiments generates from the control message of the intermediary node that is subject to the transport session discovery protocol.

FIG. 5 conceptually illustrates a TSDP message 510 that a director implementing the TSDP in accordance with some embodiments generates from the control message 430 of the intermediary node 420 that is subject to the TSDP. The TSDP message 510 source address is the address of the director generating the packet 510. The TSDP message 510 destination address is the particular protocol multicast group in which all directors of a particular PoP are listening for TSDP messages. The TSDP message 510 carries over only the information from the control message 430 that is needed to identify the error or condition identified in the control message 430 and the necessary addressing for identifying the session and connection to which the identified error or condition relates. The session identifying information, the connection identifying information, and the error or condition identifying information may be included in the TSDP message 510 body or within extended header fields. In any case, the reduced size of the TSDP message 510 relative to the control message 430 is important to minimize the amount of intra-PoP traffic that is created when the implicated session cannot be directly identified from a control message header.

In some embodiments, director operation under the TSDP further involves listening on the particular protocol multicast group for any specialized protocol packets that are sent by other directors. If such a packet is received, the director determines if the session or connection identifying information from the packet hashes or matches to an entry within the director's session table. If not, the director discards the packet. If a matching session is found, the director reconstructs a control message from the received TSDP message. In some embodiments, reconstructing the control message includes reconstructing the control message header with the error or condition status and the offending message header with the session identifying information and the connection identifying information. In some embodiments, the session identifying information includes IP addressing from the original offending packet and the connection identifying information includes the TCP sequence number from the original offending packet. The reconstructed control message may have certain header fields missing or may have different values in the header fields when those header fields are not included as part of the control message summary that is passed with the TSDP message. For example, the control message header source address may be irrelevant. This field can be populated with the director's own address rather than the address of the intermediary node sending the original control message since the field has no impact on how a server will respond to an ICMP packet too big message. The director sends the reconstructed control message to the server managing the identified session or connection. The server then takes the appropriate remedial action.

Figure 6:
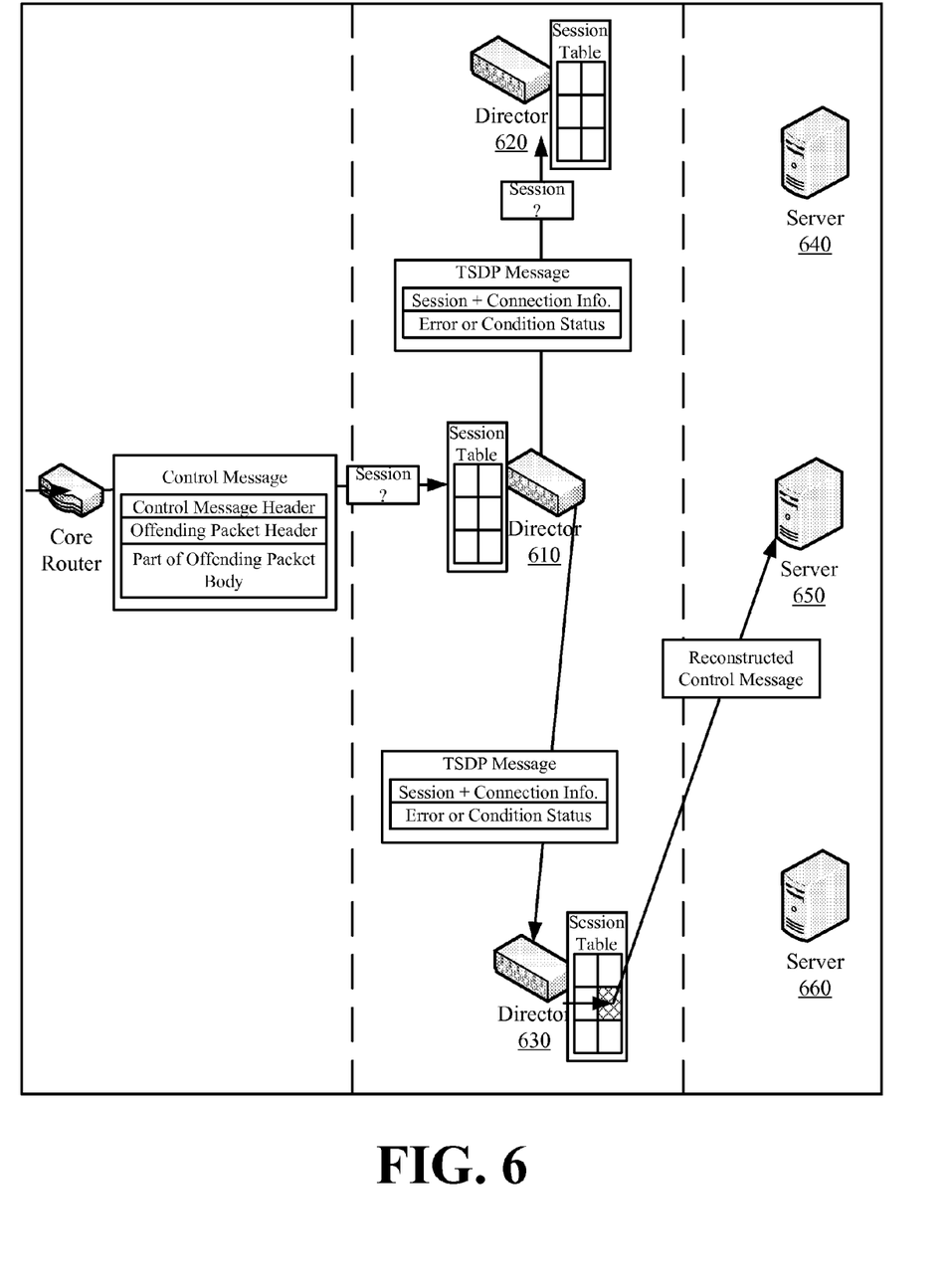
FIG. 6 conceptually illustrates a set of directors implementing the transport session discovery protocol in accordance with some embodiments.

FIG. 6 conceptually illustrates a set of directors implementing the TSDP in accordance with some embodiments. The figures illustrates a particular PoP in which three directors 610, 620, and 630 and three servers 640, 650, and 660 operate. The figure shows a first director 610 receiving an ICMP control message. The first director 610 determines that the ICMP control message implicates a session that is not tracked in the first director 610 session table. Accordingly, the first director 610 extracts the relevant session and connection identifying information as well as the error or status condition from the ICMP control message in order to generate the TSDP message. The first director 610 multicasts the TSDP message to the other two PoP directors 620 and 630.

The second director 620 determines that the session identifying addressing included as part of the TSDP message does not implicate a session tracked by the second director 620 session table. However, the third director 630 determines that a hash of the session identifying addressing included as part of the TSDP message implicates a session tracked within the third director 630 session table. The third director 630 determines that server 650 is engaged in the implicated session.

To convey the error or condition status to the server 650, the third director 630 deconstructs the TSDP message back to a format that the server 650 can process. Accordingly, the third director 630 reconstructs the control message as completely as possible from the TSDP message before sending the reconstructed control message to server 650. At the very least, the reconstructed control message includes the session identifying addressing, TCP sequence number (when a TCP connection is involved), and the error or status condition from which the server 650 can identify the implicated session and modify its transmission to resolve the error or condition.

Figure 7:
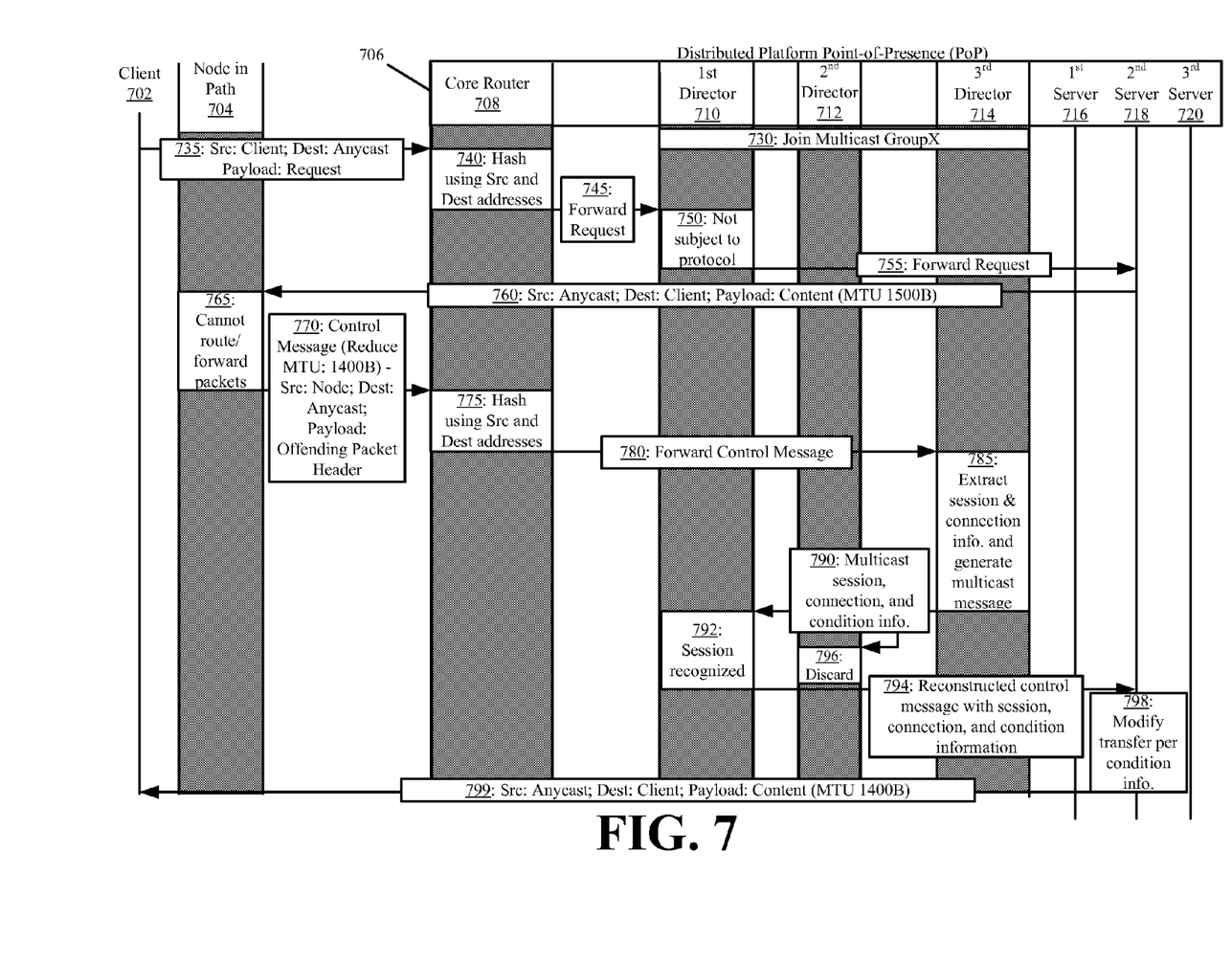
FIG. 7 illustrates a message exchange demonstrating execution of the transport session discovery protocol in accordance with some embodiments.

FIG. 7 illustrates a message exchange demonstrating execution of the TSDP in accordance with some embodiments. The message exchange involves a client 702, intermediary network node 704, and several nodes of a distributed platform PoP 706. The intermediary network node 704 can be any of several nodes in the communication pathway between the client 702 and the PoP 706. In other words, the intermediary network node 704 is one of the many hops over which packets, messaging, or other data of a particular session or connection established between the client 702 and a particular PoP 706 node travel. The intermediary network node 704 can by any of a router, server, proxy, switch, or gateway as some examples. The PoP 706 nodes include a core router 708, a first director 710, a second director 712, a third director 714, a first server 716, a second server 718, and a third server 720.

Prior to commencement of the message exchange, the first director 710, the second director 712, and the third director 714 join (at 730) a particular multicast group in order to listen for TSDP messages from other directors of the PoP 706. The message exchange commences with the client 702 issuing (at 735) a request that is addressed to an Anycast address advertised by the core router 708. In this figure, the core router 708 receives the request. The request can be a HyperText Transfer Protocol (HTTP) GET message with a Uniform Resource Locator (URL) specifying the content or service that is being requested.

The core router 708 hashes (at 740) the request. In some embodiments, the core router 708 hashes the source and destination IP addresses from the request packet header. The core router 708 forwards (at 745) the request to the first director 710 based on a result of the hash.

The first director 710 determines (at 750) that the request is not subject to the TSDP because it is not a qualifying control, error, or status message. The first director 710 also determines whether a session exists for the request by querying the first director's session table. In some embodiments, the query is performed using the source IP address, source port, destination IP addresses, and destination port from the request packet header. For a new request, a session entry will not exist in the session table. Consequently, the first director 710 selects one of PoP servers to forward the request to using a persistent hash, such as the cache array routing protocol (CARP). In this figure, the first director 710 forwards (at 755) the request to the second server 718 and creates a new session entry in the first director 710 session table identifying the second server 718 as responsive to the address combination for this particular session.

The second server 718 responds to the request by encapsulating the requested content as a set of packets and sending (at 760) the set of packets to the client 702. However, the intermediary network node 704 in the transmission path connecting the client 702 to the PoP 706 detects (at 765) an issue with how the packets are formed or how the packets are sent. The issue prevents the intermediary network node 704 from forwarding the packets further down the connection path towards the client 702. One such issue is an unsupported MTU, whereby the second server 718 sends packets of a size that is too big for the intermediary network node 704 to route and the intermediary network node 704 does not perform fragmentation of such packets. This issue can occur even when the second server 718 generates the packets with a size supported by the intermediary network node 704, but the size of the packets grow during transmission as a result of IPv6-to-IPv4 tunneling or other packet encapsulations or modifications.

In response to the identified issue, the intermediary network node 704 sends (at 770) a control message back to the source of the offending packet. In some embodiments, the source of the offending packet is identified based on the source address entered in the offending packet header. As noted above, in Anycast reliant distributed platforms, the source address may be the Anycast address rather than unique IP addresses of the server 718 sending the packet. The control message instructs the offending packet sender of the issue and may also directly or indirectly specify what action is needed to resolve the issue. Continuing with the MTU example from above, the intermediary network node 704 would pass an Internet Control Message Protocol (ICMP) message with the appropriate value set for the code field to indicate a packet that is too big. The ICMP message may also indicate the maximum MTU that is supported by the intermediary network node 704 (i.e., an MTU smaller than that of the offending packet). Additionally, the ICMP includes the header of the offending packet (i.e., the packet that caused the control message to issue) per Request for Comment (RFC) 2468 and RFC 4443. It should be noted that other control messages using the same or other protocols are supported by the embodiments described herein.

The control message passes (at 770) from the intermediary network node 704 to the core router 708. The core router 708, being stateless and having no information of the active session, performs (at 775) a hash based on the addressing of the control message to incorrectly select the third director 714 to receive (at 780) the control message.

The third director 714 determines that the control message is subject to the TSDP. Accordingly, the third director 714 parses the control message to extract (at 785) session and connection identifying information from the message body. The third director 714 encapsulates the extracted session and connection identifying information along with any condition or error identified by the control message in a TSDP message. The third director 714 then multicasts (at 790) the generated TSDP message to the multicast group that all directors previously joined at step 730. Accordingly, the first director 710 and the second director 712 both receive the TSDP message.

Each of the first director 710 and the second director 712 then query their session tables to determine if they have knowledge of the session implicated by the control message. The first director 710 recognizes (at 792) the session implicated by the session identifying information from the TSDP message as a result of having received and routed to the second server 718, the initial request that initiated the session at issue. Accordingly, the first director 710 reconstructs the control message from the TSDP message and sends (at 794) the reconstructed control message to the second server 718. The second director 712 discards (at 796) the TSDP message having no knowledge of the implicated session.

Once the second server 718 receives the reconstructed control message, it modifies (at 798) its transmission of the requested content accordingly. In the message exchange of FIG. 7, the reconstructed control message identifies that the packets being sent by the second server 718 are larger than a MTU supported by node somewhere in the network pathway to the client 702. The second server 718 responds by reducing the size of the packets it sends (at 799).

The TSDP has primarily been described for ICMP packet too big control messages. However, TSDP can be used to ensure that other control or error messages are received by the appropriate server in a PoP of an Anycast reliant distributed platform. For example, the protocol can be used to ensure proper routing of congestion control messages used in controlling Transmission Control Protocol (TCP) window sizing and window scaling. The protocol can also be used to ensure proper routing of other error or control messages that could cause the server managing the implicated session to reduce the rate at which it sends packets over the implicated session, change the type of service, change protocols, create an encrypted tunnel, etc.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
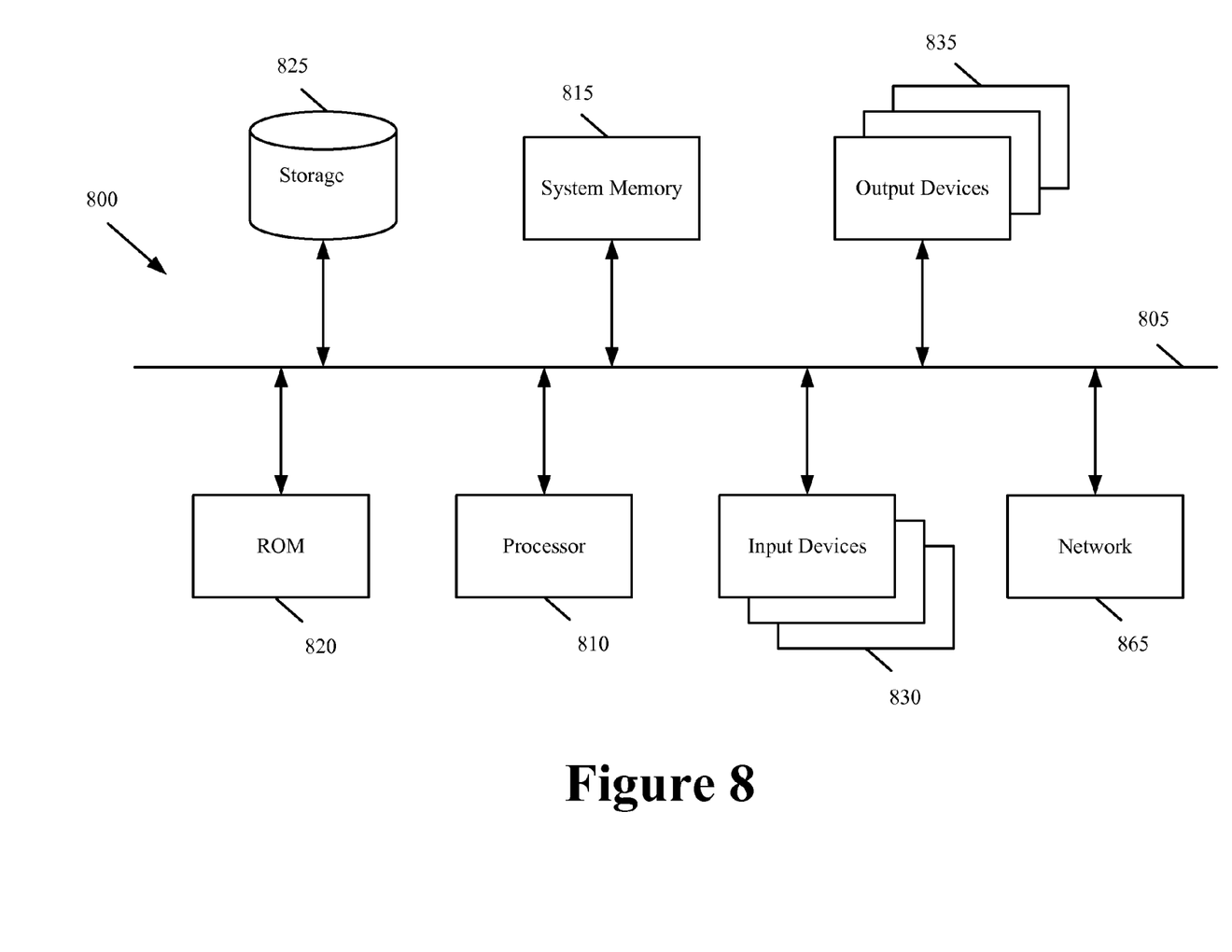
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines described above (e.g., core router, director, and server). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices. The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for directing control messages in a Point-of-Presence (PoP) comprising a plurality of load balancing devices and a plurality of servers with the plurality of servers providing at least one of content and services to different clients, the method comprising:

passing during an established session between a particular server of the plurality of servers and a client, a packet addressed from a first address of the PoP to a second address of the client;

receiving at a first load balancing device of the plurality of load balancing devices, a control message comprising an error or status condition, a first header of the control message, and a second header of the packet, wherein the first header specifies a third address of an intermediary node outside the PoP and the first address, and wherein the second header specifies the first address and the second address; and sending a new control message from the first load balancing device to all other load balancing devices of the plurality of load balancing devices when the addressing from the first header or the second header does not implicate a session that is tracked by the first load balancing device, wherein the new control message comprises the first address and the second address extracted from the second header and said error or condition status.

2. The method of claim 1 further comprising identifying, in response to said sending of the new control message, a second load balancing device of the plurality of load balancing devices tracking the session implicated by the first and second addresses from the new control message.

3. The method of claim 2 further comprising routing the error or status condition from the new control message to the particular server established as one endpoint of said session.

4. The method of claim 3 further comprising modifying packets generated by the particular server for the session established between the particular server and the client in response to said routing of the error or status condition.

5. The method of claim 4, wherein modifying the packets generated by the particular server comprises reducing one of a size or rate of packets sent over the established connection between the particular server and the client.

6. The method of claim 1 further comprising creating said session in a session table of the second load balancing device without creating an entry for said session in a session table of the first load balancing device.

7. The method of claim 1 further comprising joining each load balancing device of the plurality of load balancing devices to a particular multicast group.

8. The method of claim 7, wherein sending the new control message comprises multicasting the new control message to the particular multicast group.

9. The method of claim 1, wherein the new control message is a smaller size than the control message.

10. The method of claim 1, wherein the control message is an Internet Control Message Protocol (ICMP) message.

11. The method of claim 10, wherein the new control message is a User Datagram Protocol (UDP) message comprising only a part of the control message.

12. The method of claim 1, wherein the second header further specifies a source port and a destination port, and wherein the new control message further comprises the source port and the destination port extracted from the second header.

13. A method comprising:
maintaining a different session table at each of a plurality of load balancing devices operating within a particular point-of-presence (PoP);

receiving at a first load balancing device of the plurality of load balancing devices, a control message comprising an error or status condition, a control message header, and an offending packet header from an offending packet triggering said error or status condition;

determining a set of sessions tracked within a session table of the first load balancing device omits a session implicated by the control message header or the offending packet header;

generating at the first load balancing device, a new message from addressing of the offending packet header and said error or status condition from the control message;

sending the new message from the first load balancing device to all other load balancing devices of the plurality of load balancing devices;

matching, in response to sending the new message, said addressing of the offending packet header from the new message to a session identified within a session table of a second load balancing device of the plurality of load balancing devices; and routing at least the error or status condition from the second load balancing device to a particular server of a plurality of PoP servers operating as one endpoint of said session.

14. The method of claim 13 further comprising extracting said addressing from the offending packet header and said error or status condition from the control message header.

15. The method of claim 13, wherein sending the new message comprises multicasting the new message from the first load balancing device to all other load balancing devices of the plurality of load balancing devices.

16. The method of claim 13 further comprising entering said session to the session table of the second load balancing device as a result of receiving a content request at the second load balancing device and forwarding the content request to the particular server.

17. The method of claim 16, wherein entering said session to the session table of the second load balancing device comprises hashing addressing from the content request and selecting the particular server from the plurality of PoP servers to respond to said request based on a result of said hashing.

18. The method of claim 13, wherein said session is established between the particular server and a client, and wherein the control message originates from an intermediary node through which the offending packet passes in order to reach the client.

19. The method of claim 13, wherein said determining comprises hashing any of the control message header or the offending packet header with a result of said hashing not identifying any session of the set of sessions tracked within the session table of the first load balancing device.

* * * * *